US012602110B2

(12) United States Patent
Bibl et al.

(10) Patent No.: US 12,602,110 B2
(45) Date of Patent: Apr. 14, 2026

(54) SENSING GLOVES FOR PERFORMING TASKS

(71) Applicant: Tacta Systems Inc., Palo Alto, CA (US)

(72) Inventors: Andreas Bibl, Los Altos, CA (US); Dariusz Golda, Portola Valley, CA (US); Vikram Pavate, Foster City, CA (US); Nahid Harjee, Sunnyvale, CA (US); David Bibl, Scotts Valley, CA (US)

(73) Assignee: Tacta Systems Inc., Palo Alto, CA (US)

( * ) Notice: Subject to any disclaimer, the term of this patent is extended or adjusted under 35 U.S.C. 154(b) by 0 days.

(21) Appl. No.: 18/799,570

(22) Filed: Aug. 9, 2024

(65) Prior Publication Data

US 2026/0044210 A1    Feb. 12, 2026

(51) Int. Cl.
*G06F 3/01* (2006.01)
*B25J 13/08* (2006.01)

(52) U.S. Cl.
CPC ............ *G06F 3/014* (2013.01); *B25J 13/082* (2013.01); *B25J 13/085* (2013.01); *G06F 3/016* (2013.01)

(58) Field of Classification Search
CPC ........ G06F 3/014; G06F 3/016; B25J 13/082; B25J 13/085
See application file for complete search history.

(56) References Cited

U.S. PATENT DOCUMENTS 4,668,861 A     5/1987   White
4,775,961 A    10/1988   Capek et al.
5,760,530 A     6/1998   Kolesar
              (Continued)

FOREIGN PATENT DOCUMENTS

CN       105575219 A  *  5/2016  ............. G06V 40/28
CN       106371611 A  *  2/2017  ............. G06F 3/016
              (Continued)

OTHER PUBLICATIONS

"Learning the signatures of the human grasp using a scalable tactile glove," Subramanian Sundaram, Petr Kellnhofer, Yunzhu Li, Jun-Yan Zhu, Antonio Torralba & Wojciech Matusik; Nature, vol. 569; May 30, 2019; https://doi. org/10.1038/s41586-019-1234-z; 19 pages.
              (Continued)

*Primary Examiner* — Ibrahim A Khan
(74) *Attorney, Agent, or Firm* — Aikin & Gallant, LLP

(57)        ABSTRACT

A system can receive a measurement from a sensing glove utilized to perform a task with an object. The measurement may be based on digital outputs of force sensor arrays and digital outputs of motion sensors, including a force sensor array and a motion sensor corresponding to each of a plurality of finger sections of fingers of the sensing glove. The system can generate feedback based on a comparison between the measurement and a primary measurement from a primary sensing glove utilized to perform the task with the object. The primary measurement may be based on digital outputs of force sensor arrays and digital outputs of motion sensors of the primary sensing glove that correspond to digital outputs of the sensing glove. Other aspects are also described and claimed.

24 Claims, 11 Drawing Sheets

(56) References Cited

U.S. PATENT DOCUMENTS

| | | | |
|---|---|---|---|
| 6,593,756 | B1 | 7/2003 | Shmidt et al. |
| 7,168,748 | B2 | 1/2007 | Townsend et al. |
| 7,658,119 | B2 | 2/2010 | Loeb et al. |
| 7,673,528 | B2 | 3/2010 | Yoon et al. |
| 7,673,916 | B2 | 3/2010 | Greenhill et al. |
| 7,707,001 | B2 | 4/2010 | Obinata et al. |
| 7,878,075 | B2 | 2/2011 | Johansson et al. |
| 8,181,540 | B2 | 5/2012 | Loeb et al. |
| 8,272,278 | B2 | 9/2012 | Loeb et al. |
| 8,483,880 | B2 | 7/2013 | De La Rosa Tames et al. |
| 8,934,999 | B2 | 1/2015 | Kalayjian |
| 9,080,918 | B2 | 7/2015 | Loeb et al. |
| 9,381,645 | B1 | 7/2016 | Yarlagadda et al. |
| 9,415,517 | B2 | 8/2016 | Naidu et al. |
| 9,477,909 | B2 | 10/2016 | Loeb et al. |
| 9,613,180 | B1 | 4/2017 | Hoffmann et al. |
| 9,652,037 | B2 | 5/2017 | Rubin et al. |
| 9,904,358 | B2 | 2/2018 | Rubin et al. |
| 10,055,019 | B2 * | 8/2018 | Beran .................. G06F 3/0304 |
| 10,176,529 | B2 | 1/2019 | Amigo et al. |
| 10,222,859 | B2 | 3/2019 | Rubin et al. |
| 10,666,252 | B2 | 5/2020 | Frangen et al. |
| 10,732,711 | B2 | 8/2020 | Rubin et al. |
| 10,754,308 | B2 | 8/2020 | De Magistris et al. |
| 10,809,804 | B2 | 10/2020 | Goupil et al. |
| 10,824,282 | B2 | 11/2020 | Vallett et al. |
| 10,897,940 | B2 * | 1/2021 | Xu ......................... G01G 19/52 |
| 10,942,572 | B1 * | 3/2021 | Israr ........................ G06F 3/014 |
| 10,952,672 | B2 * | 3/2021 | Rogers ................. A61B 5/7221 |
| 10,996,756 | B1 * | 5/2021 | Ahne .................. G06F 3/04886 |
| 11,006,861 | B2 * | 5/2021 | Di Pardo ............... A61B 5/225 |
| 11,009,949 | B1 * | 5/2021 | Elias ...................... G06F 3/0414 |
| 11,025,175 | B1 * | 6/2021 | Landig .................... G02C 7/083 |
| 11,061,472 | B2 | 7/2021 | Crockett et al. |
| 11,132,058 | B1 * | 9/2021 | Gupta ..................... G06F 3/017 |
| 11,148,299 | B2 | 10/2021 | Yui |
| 11,162,858 | B2 | 11/2021 | Dade et al. |
| 11,221,263 | B2 | 1/2022 | Tsai et al. |
| 11,243,125 | B2 | 2/2022 | Tsai et al. |
| 11,243,126 | B2 | 2/2022 | Bergemont et al. |
| 11,255,737 | B2 | 2/2022 | Foughi et al. |
| 11,262,797 | B1 | 3/2022 | Hoen et al. |
| 11,267,126 | B2 | 3/2022 | Asano et al. |
| 11,287,340 | B2 | 3/2022 | Jiang et al. |
| 11,312,581 | B2 | 4/2022 | Huang et al. |
| 11,341,826 | B1 | 5/2022 | Wiley et al. |
| 11,360,564 | B1 * | 6/2022 | Shin ........................ G06F 3/016 |
| 11,371,903 | B2 | 6/2022 | Rogers et al. |
| 11,385,108 | B2 | 7/2022 | Diestelhorst et al. |
| 11,389,968 | B2 | 7/2022 | Alspach et al. |
| 11,400,587 | B2 | 8/2022 | Holly et al. |
| 11,413,748 | B2 | 8/2022 | Colasanto et al. |
| 11,423,686 | B2 | 8/2022 | Tsai et al. |
| 11,433,555 | B2 | 9/2022 | Smith et al. |
| 11,440,183 | B2 | 9/2022 | Huang et al. |
| 11,446,816 | B2 | 9/2022 | Goldberg et al. |
| 11,460,364 | B1 | 10/2022 | Chen |
| 11,460,919 | B1 | 10/2022 | Gashler et al. |
| 11,472,040 | B2 | 10/2022 | Yerazunis et al. |
| 11,490,669 | B1 * | 11/2022 | Liu .................. A41D 19/01588 |
| 11,534,923 | B1 | 12/2022 | De Arruda Camargo Polido |
| 11,875,694 | B2 | 1/2024 | Yoshimoto et al. |
| 11,900,777 | B2 * | 2/2024 | Ishimaru ................ A41D 13/00 |
| 12,340,023 | B2 * | 6/2025 | Shin ........................ G06F 3/014 |
| 2006/0211523 | A1 * | 9/2006 | Sabatino .............. A63B 71/143 |
| | | | 473/453 |
| 2008/0171311 | A1 * | 7/2008 | Centen ................. A61H 31/005 |
| | | | 601/41 |
| 2009/0132088 | A1 | 5/2009 | Taitler |
| 2009/0199636 | A1 * | 8/2009 | Ridenour ............... A61B 5/225 |
| | | | 702/138 |
| 2011/0094306 | A1 | 4/2011 | Bratkovski et al. |
| 2011/0292049 | A1 * | 12/2011 | Muravsky ............... G06F 3/014 |
| | | | 250/221 |
| 2012/0065784 | A1 | 3/2012 | Feldman |

| | | | |
|---|---|---|---|
| 2012/0116548 | A1 * | 5/2012 | Goree ................. A61B 5/7253 |
| | | | 700/90 |
| 2013/0197399 | A1 | 8/2013 | Montgomery |
| 2013/0204435 | A1 | 8/2013 | Moon et al. |
| 2013/0211579 | A1 | 8/2013 | Kalayjian |
| 2013/0345875 | A1 | 12/2013 | Brooks et al. |
| 2016/0025615 | A1 | 1/2016 | Fishel et al. |
| 2016/0335913 | A1 * | 11/2016 | Grant .................. A43B 5/0401 |
| 2017/0010707 | A1 * | 1/2017 | Son ...................... H05K 1/0296 |
| 2017/0086519 | A1 | 3/2017 | Vigano' et al. |
| 2017/0238850 | A1 * | 8/2017 | Gonzales .......... A63B 71/0622 |
| 2018/0056520 | A1 | 3/2018 | Ozaki et al. |
| 2018/0290309 | A1 | 10/2018 | Becker et al. |
| 2019/0101981 | A1 * | 4/2019 | Elias ...................... A41D 19/00 |
| 2019/0314998 | A1 | 10/2019 | Yui |
| 2019/0359424 | A1 | 11/2019 | Avraham |
| 2020/0070354 | A1 | 3/2020 | Nakayama et al. |
| 2020/0191704 | A1 | 6/2020 | Redmond et al. |
| 2020/0201433 | A1 * | 6/2020 | Emokpae ................ G06F 3/014 |
| 2020/0323657 | A1 * | 10/2020 | Pande ................. A61H 1/0285 |
| 2020/0337933 | A1 * | 10/2020 | Sugar .................. A61B 5/6825 |
| 2020/0387222 | A1 * | 12/2020 | Adesanya .............. G06F 3/014 |
| 2021/0052221 | A1 * | 2/2021 | Panneer Selvam ... A61B 5/1117 |
| 2021/0081042 | A1 * | 3/2021 | Baier ...................... G06F 3/014 |
| 2021/0086364 | A1 | 3/2021 | Handa et al. |
| 2021/0122039 | A1 | 4/2021 | Su et al. |
| 2021/0293643 | A1 | 9/2021 | Correll et al. |
| 2021/0315485 | A1 | 10/2021 | Matusik et al. |
| 2021/0373663 | A1 | 12/2021 | Matusik et al. |
| 2021/0386145 | A1 * | 12/2021 | Dong ................. A41D 19/0024 |
| 2022/0096187 | A1 * | 3/2022 | Xu ......................... A61B 34/76 |
| 2022/0187918 | A1 * | 6/2022 | Nieman ............... G06T 19/006 |
| 2022/0221357 | A1 | 7/2022 | Elias et al. |
| 2022/0227006 | A1 | 7/2022 | Nabeto et al. |
| 2022/0250253 | A1 | 8/2022 | Nabeto et al. |
| 2022/0253138 | A1 * | 8/2022 | Kord ...................... G06F 3/017 |
| 2022/0297287 | A1 | 9/2022 | Greenwald et al. |
| 2022/0316974 | A1 | 10/2022 | Gruebele et al. |
| 2022/0318459 | A1 | 10/2022 | Narang et al. |
| 2022/0357798 | A1 * | 11/2022 | Shin ........................ G06F 3/014 |
| 2023/0226698 | A1 | 7/2023 | Chaki et al. |
| 2023/0341851 | A1 | 10/2023 | Liu et al. |
| 2023/0363710 | A1 * | 11/2023 | Yamada ............... A61B 5/6806 |
| 2023/0376112 | A1 * | 11/2023 | Dealey ................... D04B 1/102 |
| 2025/0061603 | A1 | 2/2025 | Fukui et al. |
| 2025/0138726 | A1 * | 5/2025 | Dahlgren .............. G06V 40/28 |

FOREIGN PATENT DOCUMENTS

| | | |
|---|---|---|
| CN | 111645093 A | 9/2020 |
| WO | 2023223403 A1 | 11/2023 |

OTHER PUBLICATIONS

"Conformable amplified lead zirconate titanate sensors with enhanced piezoelectric response for cutaneous pressure monitoring," Canan Dagdeviren, Yewang Su, Pauline Joe, Raissa Yona, Yuhao Liu, Yun-Soung Kim, YongAn Huang, Anoop R. Damadoran, Jing Xia, Lane W. Martin, Yonggang Huang & John A. Rogers; Nature Communications; 5:4496; DOI: 10.1038/ncomms5496; www.nature. com/naturecommunications; Aug. 5, 2014; 42 pages—additional supplementary figures included.

"Performance Metrics and Test Methods for Robotic Hands," Joe Falco, Karl Van Wyk & Elena Messina; Natl. Inst. Stand. Technol. Draft Spec. Publ. 1227; 65 pages; Oct. 2018; CODEN: NSPUE2; https://doi.org/10.6028/NIST.SP.1227-draft; 77 pages.

"Tactile and Vision Perception for Intelligent Humanoids," Shuo Gao, Yanning Dai, & Arokia Nathan; Adv. Intell. Syst. 2022, 4, 2100074; Advanced Intelligent Systems published by Wiley-VCH GmbH; DOI: 10.1002/aisy.202100074; 28 pages.

"Learning Hand-Eye Coordination for Robotic Grasping with Deep Learning and Large-Scale Data Collection," Sergey Levine, Peter Pastor, Alex Krizhevsky & Deirdre Quillen; arXiv:1603.02199v4 [cs.LG] Aug. 28, 2016; 12 pages.

"Development of a High-speed Multifingered Hand System and Its Application to Catching," Akio Namiki, Yoshiro Imai, Masatoshi

(56)            References Cited

OTHER PUBLICATIONS

Ishikawa & Makoto Kaneko; Proceedings of the 2003 IEEE/RSJ Intl. Conference on Intelligent Robots and Systems; Las Vegas, Nevada; Oct. 2003; pp. 2666-2671.

"Near static strain measurement with piezoelectric films," Arun K. Ramanathan, Leon M. Headings & Marcelo J. Dapino; ScienceDirect Sensors and Actuators A: Physical; journal homepage: www.elsevier.com/locate/sna; 301 (2020) 111654; NSF IUCRC on Smart Vehicle Concepts, Department of Mechanical and Aerospace Engineering, The Ohio State University, USA; Received Aug. 1, 2019; Available online Nov. 17, 2019; 11 pages.

"Learning Object Manipulation with Dexterous Hand-Arm Systems from Human Demonstration," Philipp Ruppel & Jianwei Zhang; 2020 IEEE/RSJ International Conference on Intelligent Robots and Systems (IROS); Oct. 25-29, 2020; Las Vegas, NV, USA (Virtual); DOI: 10.1109/IROS45743.2020.9340966; 8 pages.

An Embedded, Multi-Modal Sensor System for Scalable Robotic and Prosthetic Hand Fingers; Pascal Weiner, Caterina Neef, Yoshihisa Shibata, Yoshihiko Nakamura & Tamim Asfour; Sensors 2020, 20, 101; doi:10.3390/s20010101 www.mdpi.com/journal/sensors; 22 pages.

Huang et al.; "A Low-Noise and Monolithic Array Tactile Sensor Based on Incremental Delta-Sigma Analog-to-Digital Converters;" Electronics 2022, 11, 1206; https://doi.org/10.3390/electronics11081206; 14 pgs.

Notification of Transmittal of the International Search Report and the Written Opinion of the International Searching Authority, or the Declaration received for PCT Patent Application No. PCT/US25/38203, mailed Nov. 18, 2025, 12 pages.

* cited by examiner

1000

UTILIZE SENSING GLOVE
TO PERFORM TASK
1002

RECEIVE
MEASUREMENT FROM
SENSING GLOVE 1004

RECEIVE SENSING FROM
ENVIRONMENT 1006

CONTROL ROBOTIC
DEVICE TO PERFORM
TASK 1008

SENSING GLOVES FOR PERFORMING TASKS

BACKGROUND

Field

This disclosure relates generally to sensing gloves and, more specifically, to utilizing sensing gloves for performing tasks. Other aspects are also described.

Background Information

A sensor may refer to a device that produces an output signal for detecting a physical phenomenon. A group of sensors may form a sensor array which may be used for collecting information about an environment. Sensors of a sensor array may be arranged in a certain geometric configuration or pattern. Sensor arrays may enable collecting information over a greater area than a single sensor, and in two or three dimensions of the environment.

In operation, a sensor of a sensor array can generate an output signal indicating detection of a physical phenomenon. For example, a piezoelectric sensor can utilize the piezoelectric effect to detect changes in pressure, acceleration, temperature, strain, or force by converting such detections to electrical charge. In another example, a capacitive sensor can utilize capacitive sensing to detect an object in proximity that may be conductive or may have a dielectric constant that is different from air.

SUMMARY

Implementations of this disclosure include utilizing a multimodal sensing glove to improve the performance of tasks, including those involving objects and targets. The sensing glove utilizes a combination of sensors and sensor arrays strategically placed on palmar and dorsal sides of the glove to measure a combination of force, motion, temperature, proximity, and/or imaging data (multimodal). The measurements may be taken continuously at a plurality of time intervals as a user wearing the sensing glove (on one or both hands) performs tasks. Each measurement may be compared to a corresponding primary measurement (benchmark) taken based on one or more other users wearing a primary sensing glove to perform the same task. For example, the one or more other users could be an expert or peers of the user having previously performed the task. The primary sensing glove may correspond to the sensing glove (they may be identical, and in some cases, they may be the same sensing glove worn by different users at different times). The comparing, in turn, enables feedback from the system to be given to the user to enable one or more adjustments in performance of the task, such as increasing or decreasing an amount of force or pressure to an object with certain fingers, the thumb, and/or palm, increasing or decreasing an amount of motion with the object at certain times, and/or turning or rotating the object with certain orientations at certain times, with left and/or right hands. As a result, the sensing glove and system may enable teaching users so that tasks may be performed with greater efficiency, less fatigue, and/or breakage of fewer parts.

Some implementations may include a system receiving a measurement from a sensing glove utilized to perform a task with an object. The measurement may be based on digital outputs of force sensor arrays and digital outputs of motion sensors, including a force sensor array and a motion sensor corresponding to each of a plurality of finger sections of fingers of the sensing glove. The system can generate feedback based on a comparison between the measurement and a primary measurement from a primary sensing glove utilized to perform the task with the object. The primary measurement may be based on digital outputs of force sensor arrays and digital outputs of motion sensors of the primary sensing glove that correspond to digital outputs of the sensing glove.

Some implementations may include a sensing glove including a plurality of fingers, a thumb, a hand portion, and a wrist portion with an opening. Each finger of the plurality of fingers may include a plurality of finger sections. The sensing glove may also include a plurality of force sensor arrays. Each force sensor array may be coupled with a finger section. Each force sensor array may include a plurality of force sensors generating a plurality of digital outputs indicating force data. The sensing glove may also include a plurality of motion sensors. Each motion sensor may be coupled with a finger section. Each motion sensor may generate a digital output indicating motion data. The sensing glove may also include a processor, memory, communications device, and power source. The processor may execute instructions stored in memory to transmit, via the communications device, a measurement based on digital outputs of the plurality of force sensor arrays and digital outputs of the plurality of motion sensors. The communications device may be a wireless communications device, and the sensing glove may include a power source to enable wireless operation.

Some implementations may include a method for performing a task. The method may include: receiving a measurement from a sensing glove utilized to perform a task with an object, wherein the measurement is based on digital outputs of force sensor arrays and digital outputs of motion sensors, including a force sensor array and a motion sensor corresponding to each of a plurality of finger sections of fingers of the sensing glove; and generating feedback based on a comparison between the measurement and a primary measurement from a primary sensing glove utilized to perform the task with the object, wherein the primary measurement is based on digital outputs of force sensor arrays and digital outputs of motion sensors of the primary sensing glove that correspond to digital outputs of the sensing glove.

Some implementations may include a method for producing a connector assembly. The method may include: receiving measurements from a sensing glove utilized to perform an assembly task including a) orienting a connector housing, b) inserting the wire into the connector housing, and c) pulling the wire to test engagement with the connector housing, wherein the measurements are based on digital outputs of force sensor arrays and digital outputs of motion sensors, including a force sensor array and a motion sensor corresponding to each of a plurality of finger sections of fingers of the sensing glove; and generating feedback based on a comparison between the measurements and primary measurements from a primary sensing glove utilized to perform the task, wherein the primary measurements are based on digital outputs of force sensor arrays and digital outputs of motion sensors of the primary sensing glove that correspond to digital outputs of the sensing glove. Other aspects are also described and claimed.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure herein are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Figure 1:
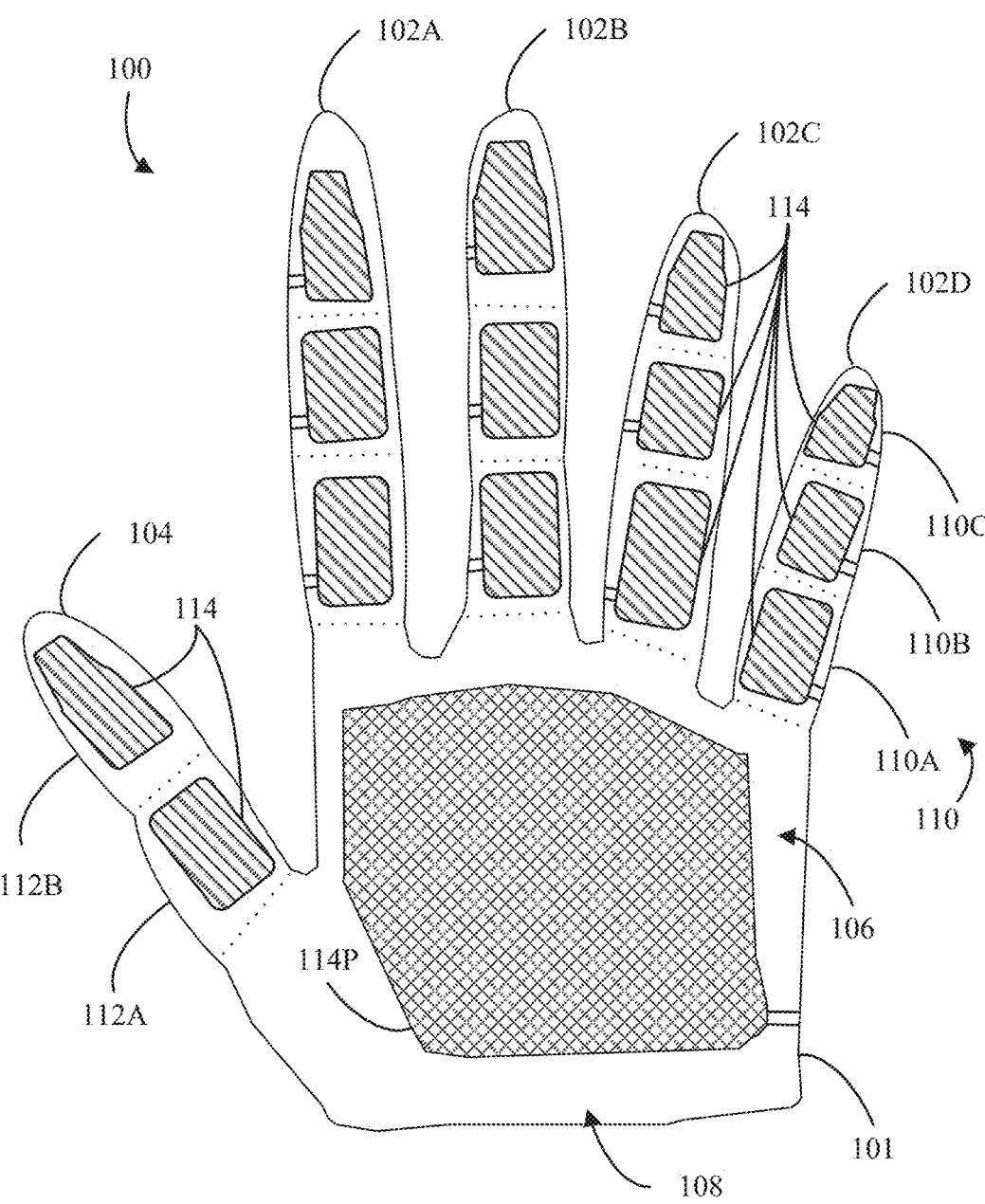
FIG. 1 is an example of a palmar side of a sensing glove.

Some work environments involve skilled workers performing manual tasks with their hands, such as handling small parts, precisely fitting components together, placing a part in a socket, deburring edges, etc. Many of these tasks require a level of delicate handling and dexterity that is beyond the capability of most machines. However, workers performing such tasks may experience fatigue. This, in turn, could possibly result in the incorrect handling of parts, dropping, and/or breaking of parts. Additionally, newer workers may be less skilled in the tasks initially, which could possibly also result in incorrect handling. A need therefore exists in many work environments to improve performance/efficiency and/or reduce breakage/fatigue when handling parts.

Implementations of this disclosure address problems such as these by utilizing a multimodal sensing glove to improve the performance of tasks, including those involving objects and targets (e.g., precisely fitting components together, placing a part in a socket, deburring edges, etc.). The sensing glove utilizes a combination of sensors and sensor arrays strategically placed on palmar and dorsal sides of the glove to measure a combination of force, motion, temperature, proximity, and/or imaging data (multimodal). For example, force sensor arrays comprised of densely packed force sensors may be coupled with sections of fingers and thumbs, and the palm, on the palmar side, and motions sensors may be coupled with the sections and a wrist portion on the dorsal side.

The measurements may be taken continuously at plurality of time intervals as a user wearing the sensing glove (on one or both hands) performs tasks. Each measurement may be compared to a corresponding primary measurement (benchmark) taken based on one or more other users wearing a primary sensing glove to perform the same task. For example, the one or more other users could be an expert or peers of the user having previously performed the task. The primary sensing glove may correspond to the sensing glove (they may be identical, and in some cases, they may be the same sensing glove worn by different users at different times). The comparing, in turn, enables feedback from the system to be given to the user to enable one or more adjustments in performance of the task, such as increasing or decreasing an amount of force or pressure to an object with certain fingers, the thumb, and/or palm, increasing or decreasing an amount of motion with the object at certain times, and/or turning or rotating the object with certain orientations at certain times, with left and/or right hands. As a result, the sensing glove and system may enable teaching users so that tasks may be performed with greater efficiency, less fatigue, and/or breakage of fewer parts.

In some implementations, a system can receive a measurement from a sensing glove (left or right) utilized to perform a task with an object. The measurement may be based on digital outputs of force sensor arrays and digital outputs of motion sensors, including a force sensor array and a motion sensor corresponding to each of a plurality of finger sections of fingers of the sensing glove. The system can generate feedback based on a comparison between the measurement and a primary measurement (e.g., a benchmark) from a primary sensing glove utilized to perform the task with the object. The primary measurement may be based on digital outputs of force sensor arrays and digital outputs of motion sensors of the primary sensing glove that correspond to digital outputs of the sensing glove.

In some implementations, the system can utilize a sensing glove having a plurality of fingers, a thumb, a hand portion, and a wrist portion with an opening for receiving the user's hand. Each finger of the plurality of fingers may include a plurality of finger sections. The sensing glove may also include a plurality of force sensor arrays (e.g., microsensors, such as piezoelectric sensors). Each force sensor array may be coupled with a finger section (e.g., palmar side, between joints). Each force sensor array may include a plurality of force sensors generating a plurality of digital outputs indicating force data. The sensing glove may also include a plurality of motion sensors (e.g., inertia measurement units, or IMUs). Each motion sensor may be coupled with a finger section (e.g., dorsal side, between joints). Each motion sensor may generate a digital output indicating motion data. The sensing glove may also include a processor, memory, communications device (wireless), and power source (battery). The communications device and the power source may enable fully wireless operation of the sensing glove. The processor may execute instructions stored in memory to transmit, via the communications device, one or more measurements based on digital outputs of the plurality of force sensor arrays and digital outputs of the plurality of motion sensors sampled at a given time (timestamped). Other aspects are also described and claimed.

Figure 2:
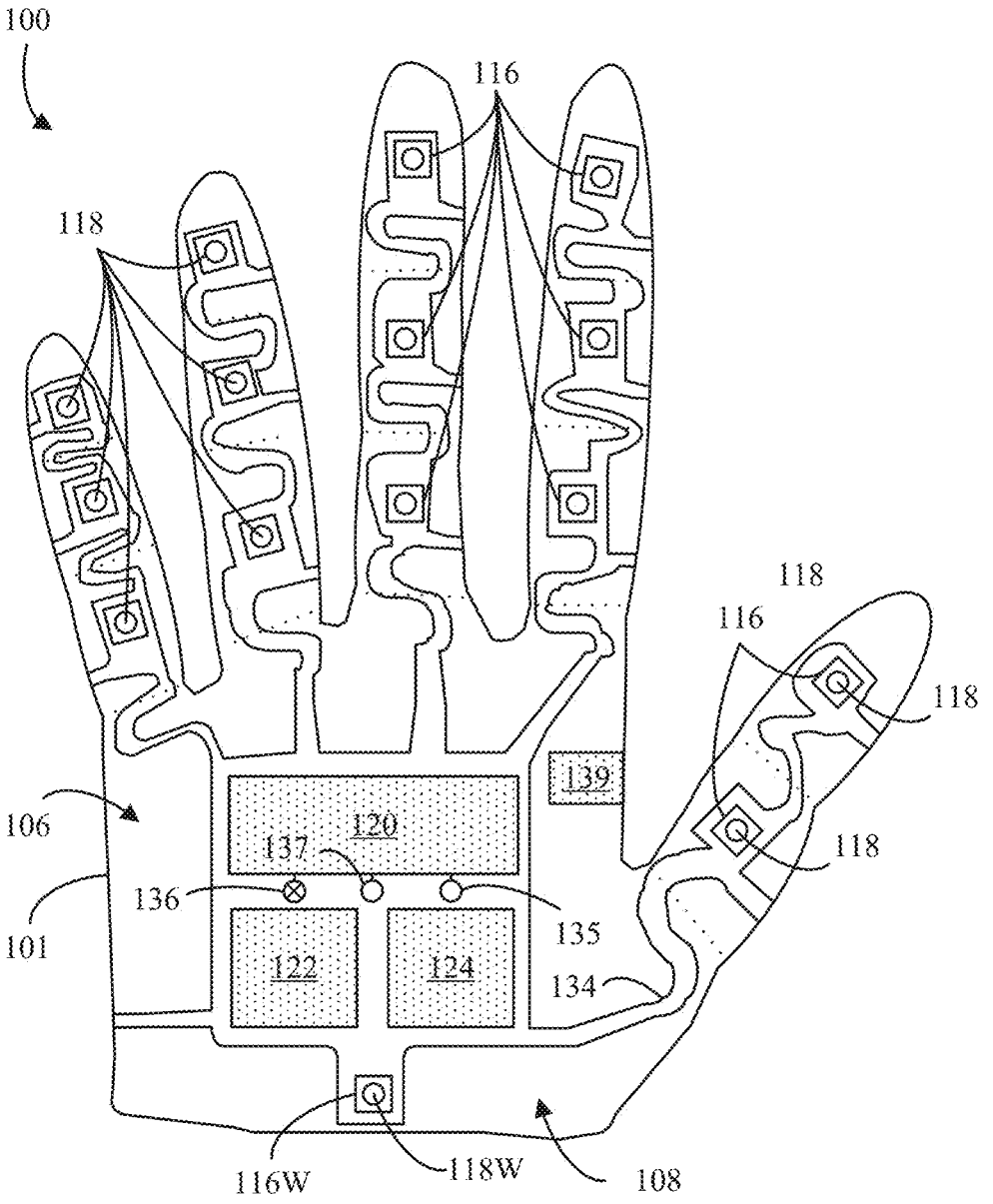
FIG. 2 is an example of a dorsal side of a sensing glove.
Figure 3:
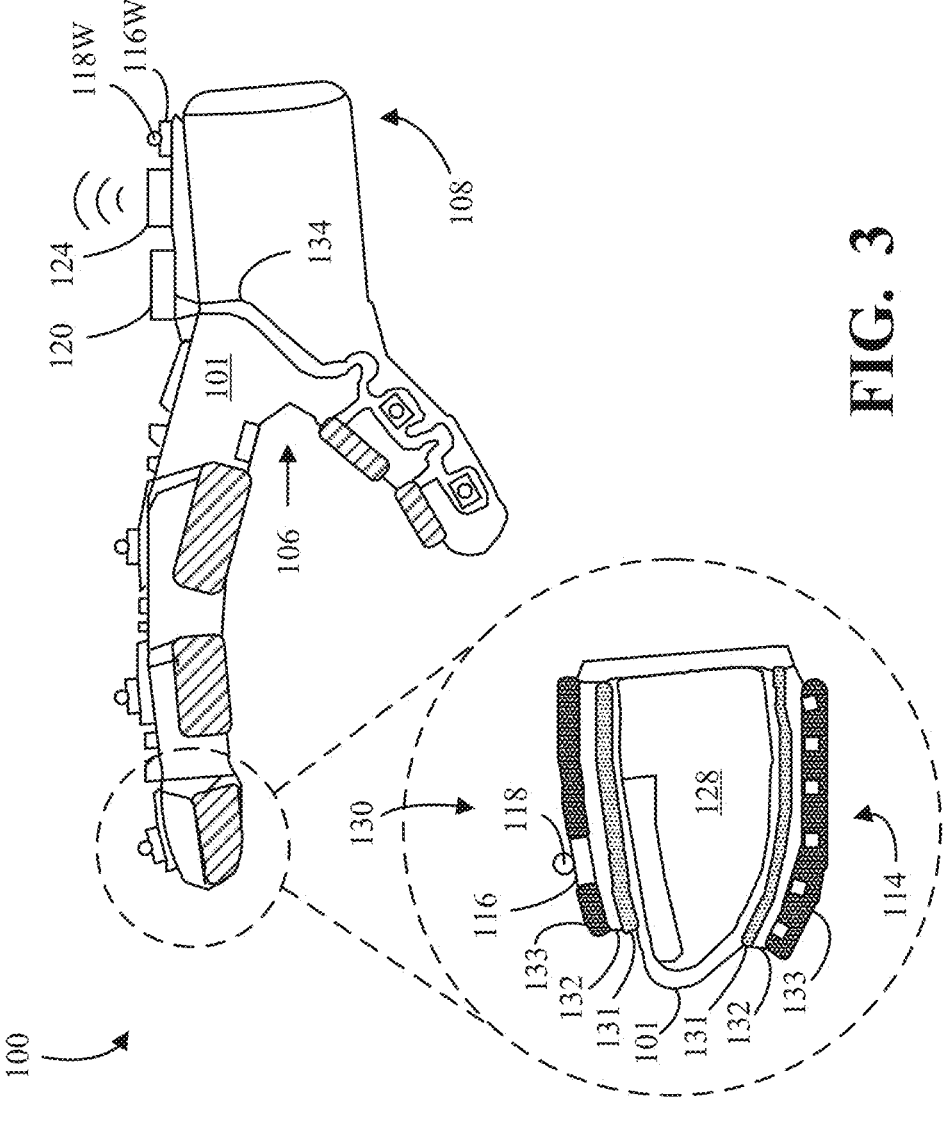
FIG. 3 is an example of a side view of a sensing glove.

FIG. 1 is an example of a palmar side of a sensing glove 100. FIG. 2 is an example of a dorsal side of the sensing glove 100. FIG. 3 is an example of a side view of the sensing glove 100. The sensing glove 100 may be a multimodal sensing glove capable of simultaneously sensing multiple types of data from multiple types of sensors at a same sampling time, such as force, motion, temperature, proximity, and/or imaging data. The sensing glove 100 may comprise a glove including a plurality of fingers 102A to 102D (e.g., four fingers), a thumb 104, a hand portion 106, and a wrist portion 108, coupled with one another, with an opening to receive a hand of a user (in left hand or right hand configurations). Each of the fingers 102A to 102D may include a plurality of finger sections defined relative to joints, such as finger section 110A between a metacarpophalangeal (MCP) joint and a proximal interphalangeal (PIP) joint, finger section 110B between the PIP joint and a distal interphalangeal (DIP) joint, and finger section 110C forward of the DIP joint (e.g., the fingertip). The thumb 104 similarly includes thumb sections relative to joints, such as thumb section 112A between an MCP joint and an interphalangeal (IP) joint, and thumb section 112B forward of the IP joint (e.g., the thumb tip).

As illustrated in FIG. 1 (palmar side of left sensing glove shown), the sensing glove 100 includes a plurality of force sensor arrays 114. Each force sensor array 114 may be used to obtain force data indicating a force or pressure applied to the sensing glove 100 in the area of the array. The force sensor arrays 114 may enable tactile sensing via normal force sensors and/or shear force sensors of the array. Each force sensor array 114 may be coupled with a textile 101 (or fabric or elastomer) of the sensing glove at a finger section 110, arranged on the palmar side of the fingers. In some implementations, an additional force sensor array may be coupled with a palmar side of the hand portion 106 (the palm), such as force sensor array 114P. Each force sensor array 114 may include a plurality of force sensors (e.g., microsensors), such as piezoelectric sensors, piezoresistive sensors, metal foil strain sensors (e.g., strain gauge), and/or capacitive sensors, arranged next to one another. Each force sensor can individually generate a digital output indicating force data that force sensing element, which may then be read out (with other force sensors of the array) by circuitry such as a processor 120. The force sensor arrays 114 may enable measurements including force or pressure distributions.

In some implementations, some force sensor arrays 114 of the sensing glove 100 may have a higher density of force sensors per unit area than other force sensor arrays of the sensing glove 100. For example, force sensor arrays 114, coupled with finger sections 110A-110C and thumb sections 112A and 112B, may have a higher density of force sensors per unit area, such as a 1×1 mm pitch between sensors, than force sensor array 114P coupled with the palm, which may have a 5×5 mm pitch between sensors (and conversely, force sensor array 114P may have a lower density of force sensors per unit area than force sensor arrays 114 coupled with the finger and thumb sections).

With additional reference to FIG. 3, including the detailed view 130 (cross section of a finger section of a right sensing glove shown, including fingertip 128 of a user), each force sensor array 114 may be coupled with a flexible circuit 132 coupled with the sensing glove 100. The flexible circuit 132 may have one or more strain reliefs (e.g., cutouts) between force sensors to enable flex and bending of the mounted circuitry (e.g., a deformable sensor array). The flexible circuit 132 may couple with the textile 101 (or fabric or elastomer) via an adhesive 131. The flexible circuit 132, and the sensors or sensor arrays, may be sealed via a flexible encapsulation 133, such as silicone. Wiring, such as electrodes 134, may wrap around the sensing glove 100 from the palmar side to the dorsal side, in a serpentine or zig zag pattern. The electrodes 134 may enable connections around joints, between each force sensor of each force sensor array 114 to digital readout circuitry, such as the processor 120, while enabling flexing, bending, and conformance of the sensing glove 100 (e.g., compliant joint routing).

As illustrated in FIG. 2 (dorsal side of left sensing glove shown), the sensing glove 100 may include a plurality of motion sensors 116. For example, each motion sensor 116 could be a multi-axis IMU, such as a six axis IMU, that senses one or more motions of the sensing glove 100. Each motion sensor 116 may be coupled with the textile 101 (or fabric or elastomer) at a finger section 110, for example, arranged on a dorsal side of the finger. Further, one or more additional motion sensors 116 may be arranged on the dorsal side of the wrist portion 108, such as motion sensor 116W. Each motion sensor 116 can individually generate its own digital output indicating motion data that may be read out by digital readout circuitry, such as the processor 120. The motion sensors 116 may enable measurements including a position, orientation, trajectory, velocity, and/or acceleration of each finger section 110 relative to the wrist portion 108, and/or an absolute position, orientation, trajectory, velocity, and/or acceleration of the wrist portion 108 of the sensing glove 100.

As illustrated in the detailed view 130 of FIG. 3, each motion sensor 116 may also be coupled with a flexible circuit 132 coupled with the sensing glove 100. The flexible circuit 132 may have one or more strain reliefs (e.g., cutouts) between motion sensors to enable flex and bending of the mounted circuitry. The flexible circuit 132 may couple with the textile 101 (or fabric or elastomer) via an adhesive 131. The flexible circuit 132, and the motion sensors, may be sealed via a flexible encapsulation 133, such as silicone. Wiring, such as electrodes 134, may wrap around joints of the sensing glove 100 in a serpentine or zig zag pattern. The electrodes 134 may enable connections between each motion sensor 116 to digital readout circuitry, such as the processor 120, while enabling flexing, bending, and conformance of the sensing glove 100.

In some implementations, the sensing glove 100 may include a plurality of optical markers 118, such as for tracking positions of the finger section 110. Each optical marker 118 may be coupled with a finger section 110, for example, arranged on a dorsal side of the finger or thumb. Further, one or more additional optical markers 118 may be arranged on the dorsal side of the wrist portion 108, such as optical marker 118W. As shown, the optical markers 118 are coupled with the motion sensor 116, centered on the finger and thumb sections and the wrist portion 108 and the motion sensor 116 location. The optical markers 118 may enable a system utilizing a scene camera or other form of detection to determine a position of each finger section 110 relative to the wrist portion 108

In some implementations, additional sensors may be coupled with the sensing glove 100, such as temperature sensors, proximity sensors, and/or image sensors. For example, one or more additional sensors may be coupled with each finger section 110 in a sensor array. In some cases, the additional sensors may be integrated with force sensor arrays 114 with respect to layout and routing. In other cases, the additional sensors may comprise additional sensor arrays like the force sensor arrays. Each additional sensor can generate a digital output indicating a corresponding type of data. For example, a temperature sensor may generate a digital output indicating temperature data, a proximity sensor may generate a digital output indicating proximity data, and an image sensor may generate a digital output indicating imaging data.

Referring again to FIG. 2, the sensing glove 100 may include circuitry, such as a processor 120 and memory, a communications device 122, and a power source 124. For example, the processor 120 and memory may be implemented by a system on a chip (SoC) or other integrated circuit (IC). The communications device 122 may be a wireless communications device implemented by an IC. The communications device 122 may, for example, an IEEE 802.X protocol (e.g., Wi-Fi, Bluetooth, or ZigBee). The power source 124 may include a battery, power supply and/or charging circuitry, and/or a connector or port for wired charging (e.g., a universal serial bus (USB) charging port) and/or wireless charging. The power source 124 may power the circuitry of the sensing glove 100, including the processor 120, memory, and communications device 122, as well as the sensors and sensor arrays (e.g., force sensor arrays 114 and motion sensors 116). The power source 124 and the communications device 122 may enable convenient, fully wireless operation of the sensing glove 100 by a user.

The processor 120 may execute instructions stored in the memory to perform various functions as a user utilizes the sensing glove 100 to perform tasks. For example, the processor 120 may execute instructions stored in memory to read digital outputs of sensors and sensor arrays (e.g., the digital outputs of the plurality of force sensor arrays 114 and digital outputs of the plurality of motion sensors 116.). The processor 120 may further execute to process the digital outputs, such as assigning a timestamp to the digital outputs corresponding to a measurement, and/or executing an algorithm to compress or encode the measurement in a bitstream. The processor 120 may also execute to transmit, via the communications device 122, the measurement to the system, and receive, via the communications device 122, feedback from the system based on the measurement. The processor 120 may also execute to generate an alert based on the feedback (triggered by the system), such as illuminating a multi-color light emitting diode (LED) 135 or applying haptic feedback via haptic actuator 139. The alert can signal to the user that performance of the task is differing from the primary measurement by more than a threshold, and that corrective action should take (e.g., increase or decrease an amount of force or motion when performing the task).

In some implementations, the sensing glove 100 can capture absolute wrist orientation and position at the wrist portion 108; relative orientation of each finger section 110 with respect to the wrist portion 108; pressure or force distributions from force sensor arrays 114 mounted on the palmar side of the sensing glove 100; and/or proximity, temperature, and/or imaging data from the sensor arrays mounted on the palmar side of the sensing glove 100. The sensing glove 100 may include the textile 101 (or fabric or elastomer) of the glove, flexible circuits 132 with arrays of microsensors, including force, temperature, proximity, and/or image sensors, affixed to the textile 101 (or fabric or elastomer) with the adhesive 131; assembled motion sensors 116 (e.g., IMUs) and/or optical markers 118 for tracking of the finger section 110 positions; the processor 120, operating as a local host controller; the power source 124, which may include a battery and/or charging port or connector; the communications device 122, which may be wireless communications IC; flexible encapsulation 133 applied to the sensors and sensor arrays (e.g., to protect the microsensors); and/or strain-relief patterns that enable the flexible circuits 132 to readily bend with the flexing of each finger joint.

The processor 120, via the communications device 122, can relay collected measurements to a control system which may include a remotely located storage device. For example, the processor 120 can relay the measurements with timestamps, at a rate of up to 100 Hz, while the user wears the sensing glove 100 during the performance of a task. In some cases, the user may wear the sensing glove 100 while assembling a module in a factory with start and stop indications for the task. The measurements can start (including streaming by the communications device 122) upon receiving a start indication that marks the start of a task. The start indication may be indicated by the user and may be sensed by the sensing glove 100, such as an audible cue sensed via microphone 136, pressing a button 137, or a predefined motion of the hand sensed via the motion sensors 116. Similarly, the measurements can stop (cease streaming by the communications device 122) upon receiving a stop indication that marks the end of the task. The end indication may be indicated by the user and may be sensed by the sensing glove 100, such as another audible cue sensed via microphone 136, pressing the button 137 again, or another predefined motion of the hand sensed via the motion sensors 116. The sensing glove 100 can operate to record multiple tasks during an entire shift of 8 hours or more between charging of the power source 124.

Figure 4:
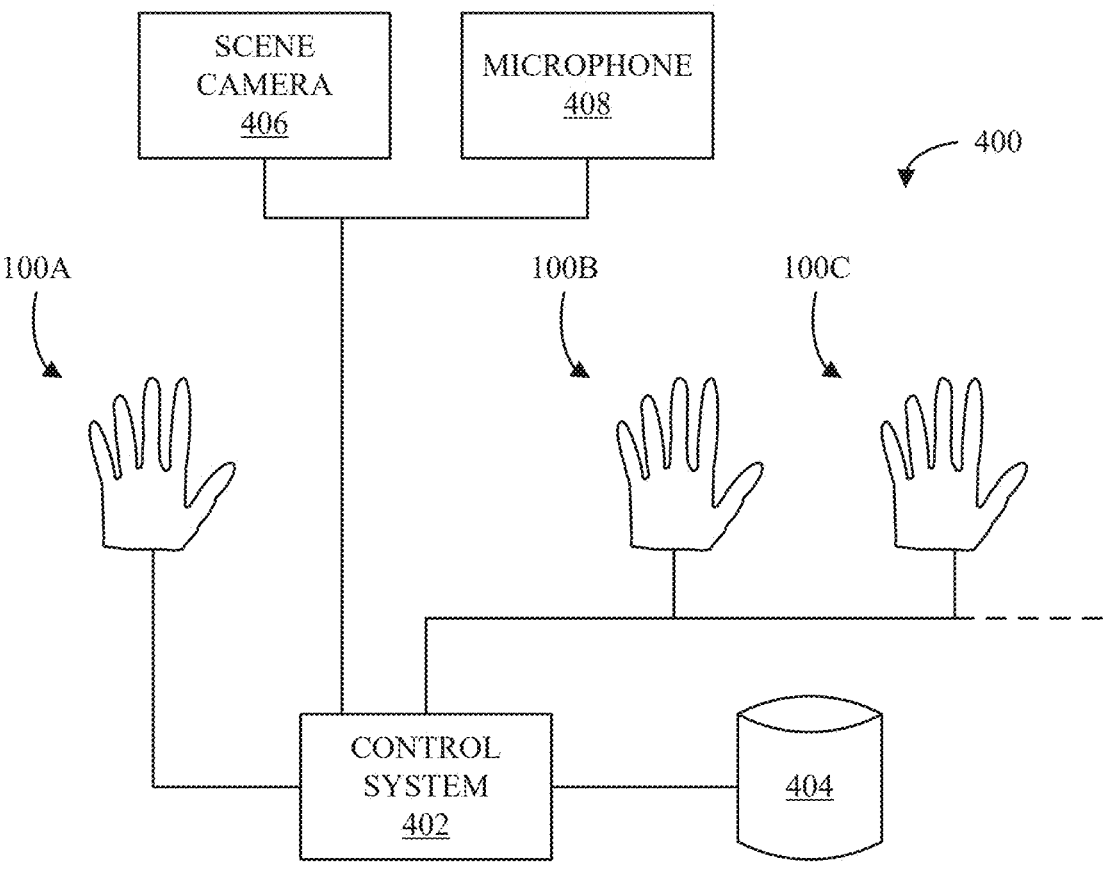
FIG. 4 is an example of a system utilizing sensing gloves.

FIG. 4 is an example of a system 400 utilizing sensing gloves 100. The system 400 may include a control system 402, a storage device 404, a scene camera 406, a microphone 408, and a plurality of sensing gloves 100, such as sensing gloves 100A to 100C shown by way of example. One or more of the sensing gloves 100 may be determined by the control system 402 as a primary sensing glove to which other sensing gloves may be compared. For example, the sensing glove 100A may be determined as a primary sensing glove, which might be utilized by an expert to perform tasks. In some cases, predefined limits for measurements, stored in the storage device 404, may be used by the control system 402.

The control system 402 can receive measurements from the primary sensing glove (e.g., sensing glove 100A) when utilized to perform a task on an object and may store the primary measurements in the storage device 404. The control system 402 can then receive measurements from the other sensing gloves (e.g., sensing gloves 100B, 100C, and/or others) when they are utilized to perform the same task with a same or similar object. The control system 402 can then generate individual feedback, based on a comparison between the measurements from the sensing gloves in the system 400 (e.g., sensing gloves 100B, 100C, and/or others) and the primary measurement from sensing glove 100A and/or the predefined limits. The control system 402 can send the feedback to each of the sensing gloves in the system 400 to enable adjustments of the tasks being performed by their users.

Figure 5:
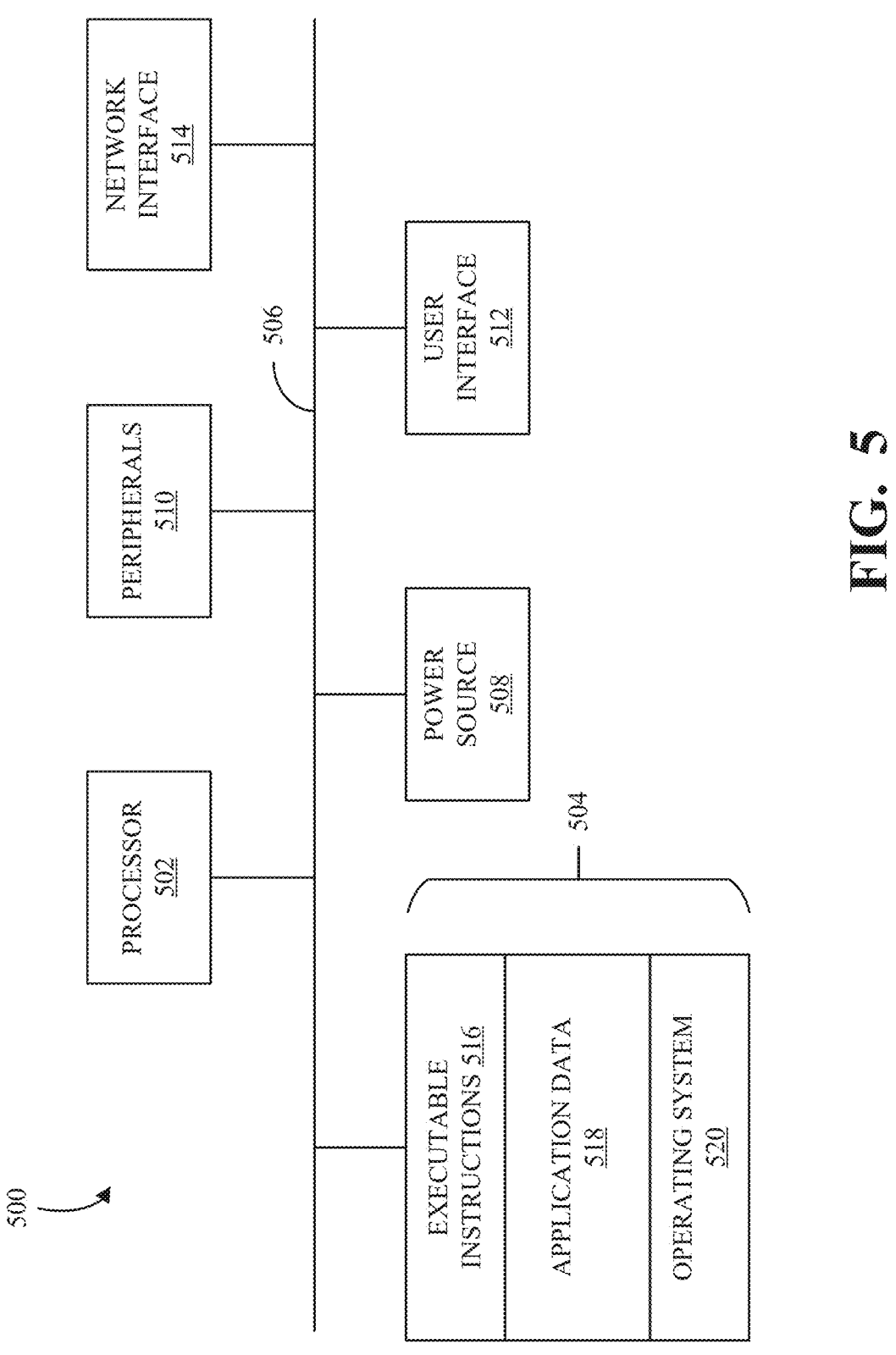
FIG. 5 is a block diagram of an example internal configuration of a computing device for utilizing sensing gloves for performing tasks.

FIG. 5 is a block diagram of an example internal configuration of a computing device 500 for utilizing sensing gloves for performing tasks. For example, the computing device 500 could be implemented by the sensing glove 100 and/or the control system 402. The computing device 500 includes components or units, such as a processor 502, a memory 504, a bus 506, a power source 508, peripherals 510, a user interface 512, a network interface 514, other suitable components, or a combination thereof. One or more of the memory 504, the power source 508, the peripherals 510, the user interface 512, or the network interface 514 can communicate with the processor 502 via the bus 506.

The processor 502 is a central processing unit, such as a microprocessor, and can include single or multiple processors having single or multiple processing cores. Alternatively, the processor 502 can include another type of device, or multiple devices, configured for manipulating or processing information. For example, the processor 502 can include multiple processors interconnected in one or more manners, including hardwired or networked. The operations of the processor 502 can be distributed across multiple devices or units that can be coupled directly or across a local area or other suitable type of network. The processor 502 can include a cache, or cache memory, for local storage of operating data or instructions.

The memory 504 includes one or more memory components, which may each be volatile memory or non-volatile memory. For example, the volatile memory can be random access memory (RAM) (e.g., a DRAM module, such as dual data rate (DDR) DRAM). In another example, the non-volatile memory of the memory 504 can be a disk drive, a solid state drive, flash memory, or phase-change memory. In some implementations, the memory 504 can be distributed across multiple devices. For example, the memory 504 can include network-based memory or memory in multiple clients or servers performing the operations of those multiple devices.

The memory 504 can include data for immediate access by the processor 502. For example, the memory 504 can include executable instructions 516, application data 518, and an operating system 520. The executable instructions 516 can include one or more application programs, which can be loaded or copied, in whole or in part, from non-volatile memory to volatile memory to be executed by the processor 502. For example, the executable instructions 516 can include instructions for performing some or all of the techniques of this disclosure. The application data 518 can include user data, database data (e.g., database catalogs or dictionaries), or the like. In some implementations, the application data 518 can include functional programs, such as a web browser, a web server, a database server, another program, or a combination thereof. The operating system 520 can be, for example, any known personal or enterprise operating system; an operating system for a mobile device, such as a smartphone or tablet device; or an operating system for a non-mobile device, such as a mainframe computer.

The power source 508 provides power to the computing device 500. For example, the power source 508 can be an interface to an external power distribution system. In another example, the power source 508 can be a battery, such as where the computing device 500 is a mobile device or is otherwise configured to operate independently of an external power distribution system. In some implementations, the computing device 500 may include or otherwise use multiple power sources. In some such implementations, the power source 508 can be a backup battery.

The peripherals 510 includes one or more sensors, detectors, or other devices configured for monitoring the computing device 500 or the environment around the computing device 500. For example, the peripherals 510 can include a geolocation component, such as a global positioning system location unit. In another example, the peripherals can include a temperature sensor for measuring temperatures of components of the computing device 500, such as the processor 502. In some implementations, the computing device 500 can omit the peripherals 510.

The user interface 512 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, virtual reality display, or other suitable display.

The network interface 514 provides a connection or link to a network. The network interface 514 can be a wired network interface or a wireless network interface. The computing device 500 can communicate with other devices via the network interface 514 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Reference is now made to flowcharts of examples of processes for utilizing sensing gloves for performing tasks. The processes can be executed using computing devices, such as the systems, hardware, and software described with respect to FIGS. 1-5. The processes can be performed, for example, by executing a machine-readable program or other computer-executable instructions, such as routines, instructions, programs, or other code. The operations of the processes or other techniques, methods, or algorithms described in connection with the implementations disclosed herein can be implemented directly in hardware, firmware, software executed by hardware, circuitry, or a combination thereof.

For simplicity of explanation, the processes are depicted and described herein as a series of operations. However, the operations in accordance with this disclosure can occur in various orders and/or concurrently. Additionally, other operations not presented and described herein may be used. Furthermore, not all illustrated operations may be required to implement a process in accordance with the disclosed subject matter.

Figure 6:
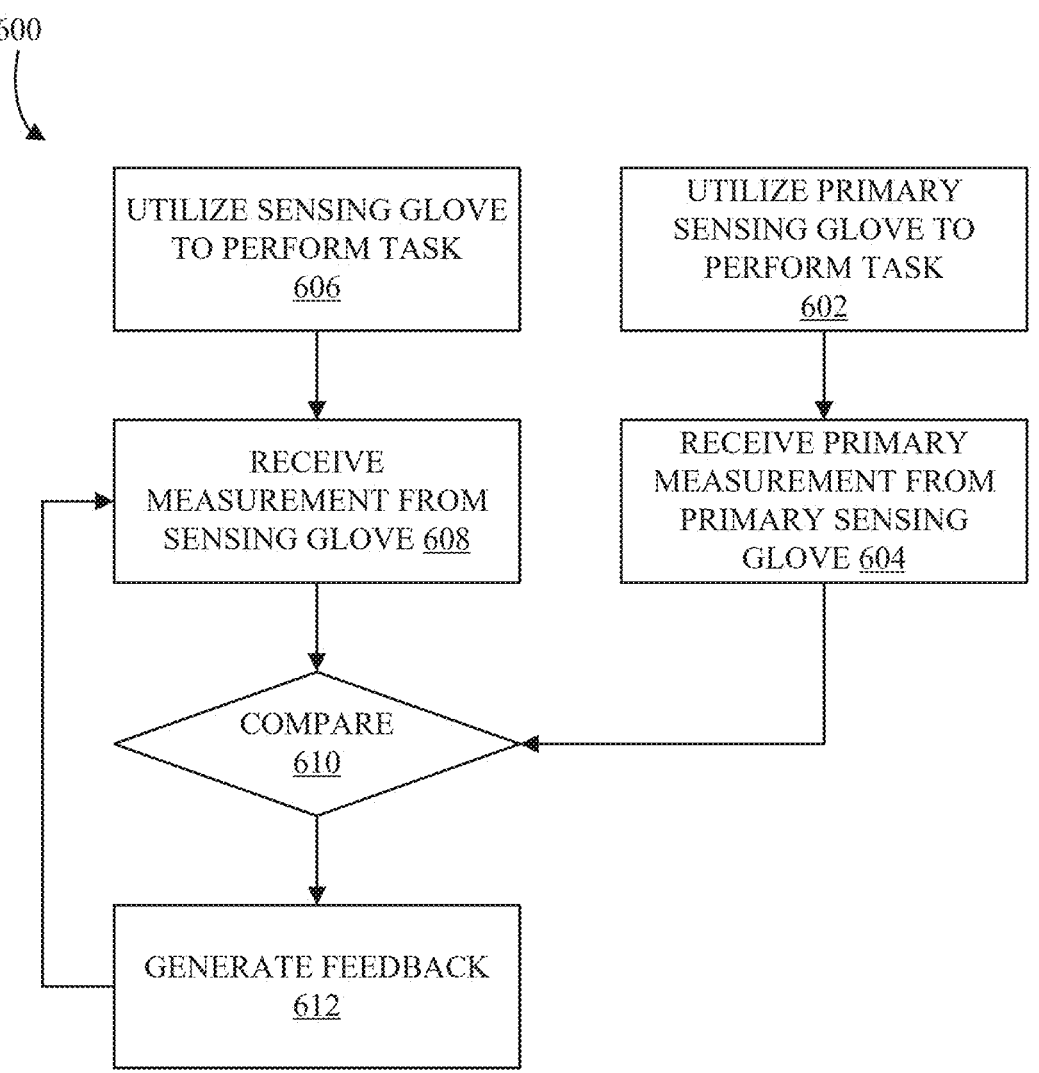
FIG. 6 is an example of a process for utilizing sensing gloves for performing tasks.

FIG. 6 is an example of a process 600 for utilizing sensing gloves for performing tasks. At operation 602, a primary sensing glove may be utilized to perform a task. For example, the primary sensing glove may be the sensing glove 100, which may be utilized by an expert or one or more peers. The task may involve an object and a target, such as precisely fitting components together, placing a part in a socket, hitting a ball with a bat, club, or racket, or using a tool to debur edges.

At operation 604, a system can receive one or more primary measurements (benchmarks) from the primary sensing glove. For example, the control system 402 can receive the primary measurements and store them in the storage device 404 for later use. In some implementations, the system can receive primary measurements corresponding to different users, such as different experts or multiple peers in a work environment.

At operation 606, a sensing glove may be utilized by a user to perform a task. For example, the sensing glove may be the sensing glove 100, which may be the same glove as the primary sensing glove (e.g., used at a subsequent time) or may be a glove that corresponds to the primary sensing glove (e.g., a same arrangement of sensors and sensor arrays). The task may involve the same object and target as used by the primary sensing glove, or a similar/corresponding object and target. For example, the task may again involve precisely fitting components together, placing a part in a socket, hitting a ball with a bat, club, or racket, or using a tool to debur edges.

At operation 608, the system can receive one or more measurements from the sensing glove. For example, the control system 402 can receive the measurements and store them in the storage device 404.

At operation 610, the system can compare the one or more measurements from the sensing glove to the one or more primary measurements from the primary sensing glove (compare to the benchmark). In some implementations, the system can compare the one or more measurements to one or more predefined minimum or maximum limits for measurements of sensors or sensor arrays. For example, the predefined limits may define minimum or maximum forces, motions, angles, speeds, accelerations, trajectories, positions, or rotations. This may be in addition to, or in alternative of, utilizing primary measurements of a primary sensing glove.

At operation 612, the system can generate feedback based on the comparing step of operation 610. The feedback may be transmitted back to the sensing glove of the user, such as by illuminating a multi-color LED (e.g., LED 135), or applying haptic feedback that can be felt by the fingers, thumb, or hand of the user through the glove (e.g., haptic actuator 139). The feedback may signal to the user that performance of the task is differing from the primary measurement by more than a threshold and/or exceeding a predefined limit. For example, the LED may illuminate green when performance is within a standard established by the primary measurements or predefined limits, illuminate yellow when performance degrades, and/or illuminate red when performance falls below the standard and/or predefined limits. This may result in an alarm to the user.

Figure 7:
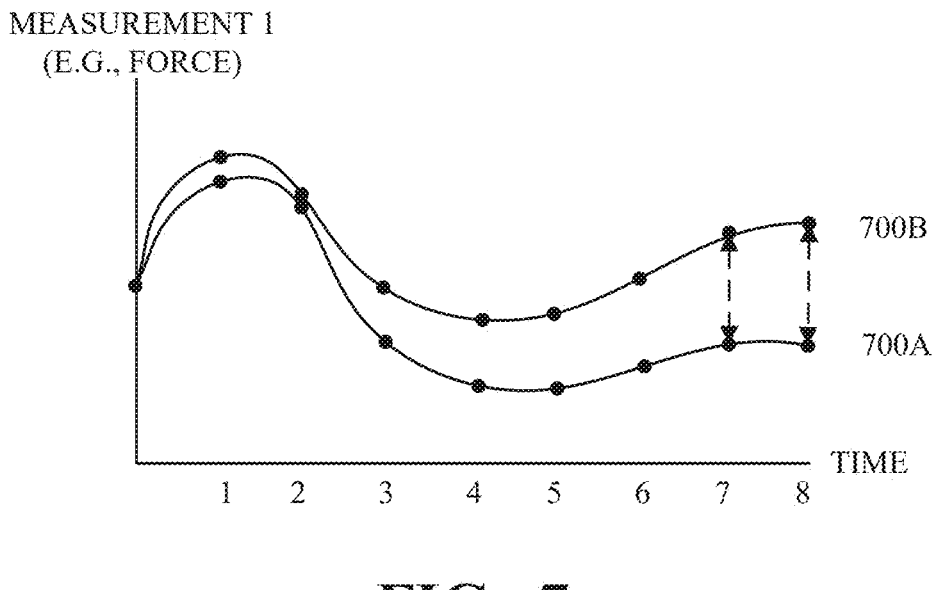
FIG. 7 is an example of comparing a sensing glove measurement (e.g., force) to a primary measurement.
Figure 8:
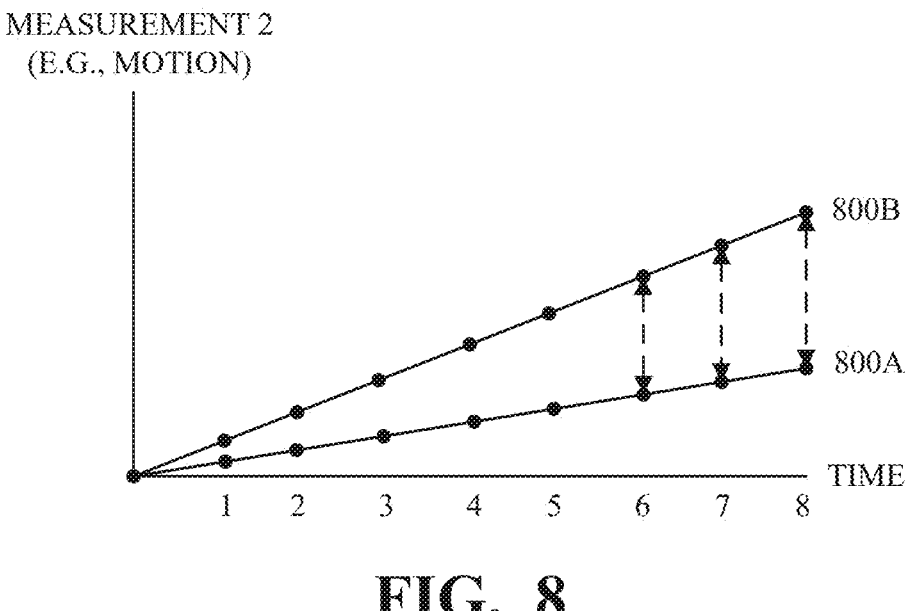
FIG. 8 is another example of comparing a sensing glove measurement (e.g., motion) to a primary measurement.

In some implementations, the feedback may be based on time stamped measurements from the sensing glove that may be compared to corresponding time stamped measurements from the primary sensing glove. For example, FIG. 7 illustrates comparing one type of measurement from the sensing glove, e.g., force data 700B (or pressure) from force sensor arrays 114 of sensing glove 100B, to the corresponding type of measurements from the primary sensing glove, e.g., force data 700A (or pressure) from force sensor arrays 114 of sensing glove 100A, based on matching time stamps. FIG. 8 illustrates comparing another type of measurement from the same sensing glove, e.g., motion data 800B from motion sensors 116 of sensing glove 100B, to another corresponding type of measurement from the primary sensing glove, e.g., motion data 800A from motion sensors 116 of sensing glove 100A, based on further matching of corresponding time stamps. Additional types of measurements may be matched and compared based on time stamping in this way, such as temperature, proximity, and/or image data. Each time stamp may have multiple types of data associated with it. Based on one or more of the types of measurements exceeding a threshold, feedback may be transmitted in the system in various ways, including alerts.

For example, referring to FIGS. 7 and 8 together, at time stamps 1 to 5, force data 700B may indicate that sensing glove 100B is applying a force within the standard (e.g., close to force data 700A from sensing glove 100A at the same time stamps), and motion data 800B may indicate that sensing glove 100B is applying a motion within the standard (e.g., close to motion data 800A). This may result in positive feedback to the sensing glove 100, such as a green illumination of the LED (e.g., the LED 135). However, at time stamp 6, motion data 800B may indicate that sensing glove 100B is applying a motion that exceeds the standard (e.g., sensing glove 100B is moving too fast), though force data 700B may indicate that sensing glove 100B is still applying a force within the standard. This may result in neutral or cautionary feedback to the sensing glove 100, such as a yellow illumination of the LED. Then, at time stamps 7 and 8, motion data 800B may indicate that sensing glove 100B is still applying a motion that exceeds the standard (e.g., the sensing glove 100B is still moving too fast), and force data 700B may indicate that the sensing glove 100B is now applying a force that exceeds the standard (e.g., the sensing glove 100B is grasping too firmly). This may result in negative feedback to the sensing glove 100, such as a red illumination of the LED, indicating corrective action required by the user.

In some implementations, measurements from the sensing glove may be aggregated with measurements from other sensing gloves that are also utilized to perform the task with the object (or a similar task with a similar object). This data collection, including aggregated measurements, may enable the system to determine a performance metric corresponding to the task with the object. For example, the performance metric may indicate a measure of ergonomics, efficiency, and/or safety corresponding to performance of the task. The aggregation may include measurements from a predetermined group of users (e.g., assembly line one), through a predetermined period (e.g., one shift, one month, etc.). The performance metric may be output to a display or other device for feedback, and in some cases, may cause an alert to the user via the sensing glove (e.g., triggered by performance falling below the performance metric).

Figure 9:
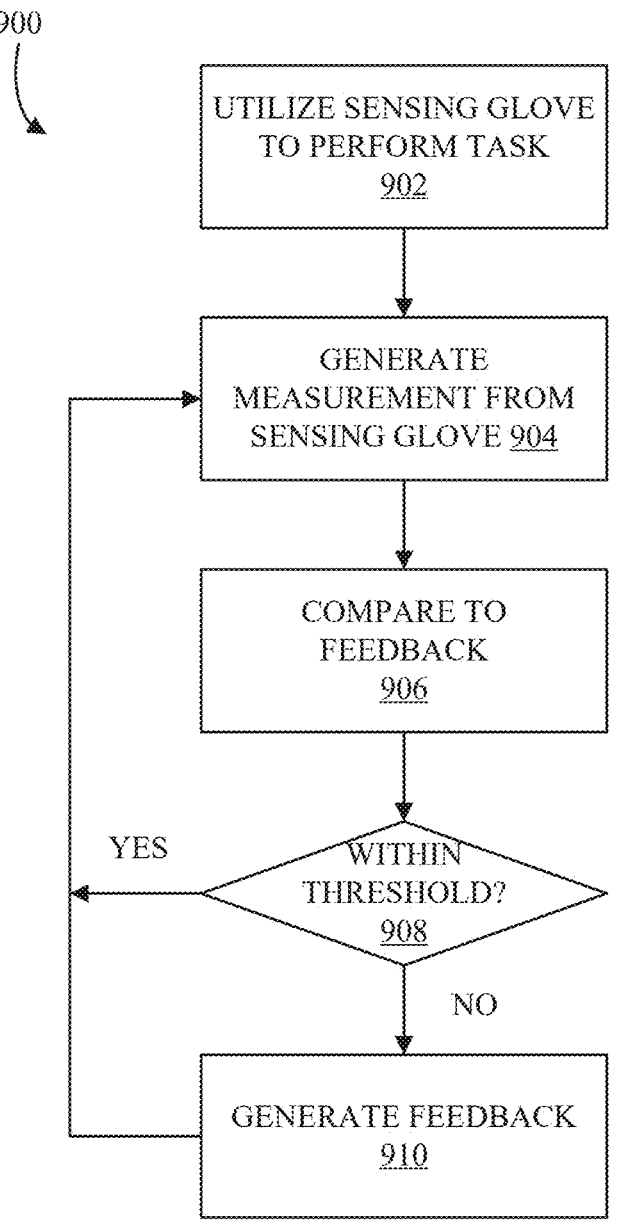
FIG. 9 is another example of a process for utilizing sensing gloves for performing tasks.

FIG. 9 is another example of a process 900 for utilizing sensing gloves for performing tasks. At operation 902, a sensing glove may be utilized by a user to perform a task. For example, the sensing glove may be the sensing glove 100. The task may involve an object and a target, such as precisely fitting components together, placing a part in a socket, hitting a ball with a bat, club, or racket, or using a tool to debur edges.

At operation 904, the sensing glove can perform one or more measurements. For example, the processor 120 can receive the one or more measurements from the sensors and sensor arrays of the sensing glove (e.g., force sensor arrays 114 and motion sensors 116) in a readout operation and store them locally. The readout operation may be triggered at time intervals for generating time stamps. The sensing glove can begin to generate the measurements for the task, which may be based on user input of a start indication.

At operation 906, the sensing glove can compare the one or more measurements to one or more primary measurements (benchmark). For example, the primary measurements may correspond to a different user, such as an expert, using a primary sensing glove. The primary sensing glove may be the same as the sensing glove or similarly configured to the sensing glove. In some implementations, the sensing glove can transmit the one or more measurements to another system (e.g., control system 402) to enable the other system to compare the one or more measurements to one or more primary measurements.

At operation 908, the sensing glove (or other system) can determine whether the one or more measurements are within a threshold of the one or more primary measurements (and/or within a threshold of one or more predefined limits). If the one or more measurements are within the threshold and/or predefined limits (Yes), the sensing glove can continue to generate further measurements and perform further comparisons (or transmissions for comparison). However, if the one or more measurements and/or predefined limits are not within the threshold (No), at operation 910 the sensing glove can generate feedback (e.g., an alert), such as illumination of an LED (e.g., LED 135) or applying haptic feedback (e.g., haptic actuator 139). The sensing glove can then continue to generate further measurements, and perform further comparisons, until completion of the task, which may be based on user input of a stop indication.

Figure 10:
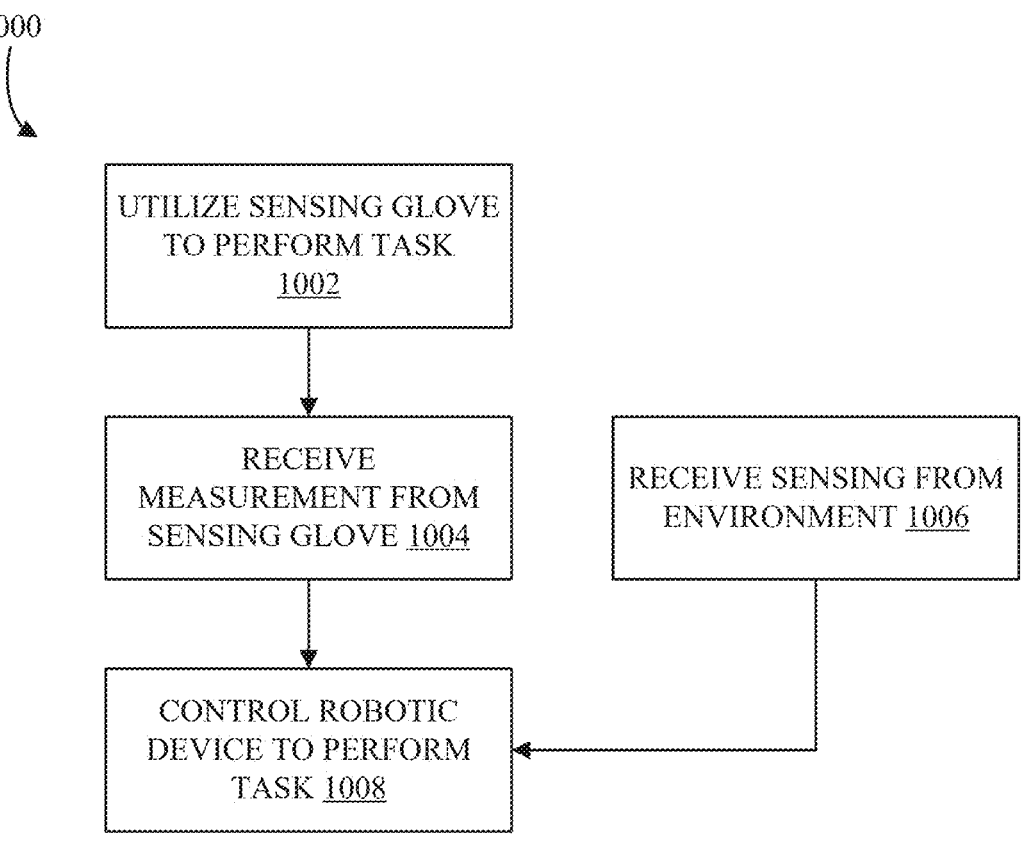
FIG. 10 is another example of a process for utilizing sensing gloves to train a machine learning model.

FIG. 10 is an example of a process 1000 for utilizing sensing gloves to train a machine learning model. At operation 1002, a sensing glove may be utilized by a user to perform a task. For example, the sensing glove may be the sensing glove 100A, which may be a primary sensing glove utilized by an expert. The task may involve an object and a target, such as precisely fitting components together, placing a part in a socket, hitting a ball with a bat, club, or racket, or using a tool to debur edges.

At operation 1004, the system can receive one or more measurements from the sensing glove, which may be primary measurements. For example, the control system 402 can receive the measurements and store them in the storage device 404. The measurements may be timestamped by the sensing glove that sends them and/or the system that receives them.

At operation 1006, the system can optionally receive sensing data from other sensing in the environment. For example, the control system 402 can receive sensing data from the scene camera 406 and/or the microphone 408. The sensing data may also be timestamped.

At operation 1008, the system can control a robotic device (e.g., robotic hand/fingers) to perform the task based on the measurements and/or other sensing in the environment. For example, a sensing glove may be worn by the robotic device, such as the sensing glove 100, which may be the same as the primary sensing glove (e.g., used at a subsequent time) or may correspond to the primary sensing glove (e.g., a same arrangement of sensors or sensor arrays). In some cases, the system can train a machine learning model, based on the measurements and/or other sensing in the environment, to control the robotic device wearing the sensing glove to perform the task The machine learning model may be trained using the measurements and/or other sensing data to make predictions for control of the robotic device. The machine learning model may, for example, be or include one or more of a neural network (e.g., a convolutional neural network, recurrent neural network, deep neural network, or other neural network), decision tree, vector machine, Bayesian network, cluster-based system, genetic algorithm, deep learning system separate from a neural network, or other machine learning model.

As a result, systems described herein may enable, among other things, a manufacturing facility to record measurements including motions and forces applied by a primary user or expert during a dexterous task (primary measurements, or benchmarks), then record measurements including motions and forces of other users for comparison to the primary measurements, such as for training and/or quality control. For example, if a user applies too much force to a delicate object, or too little force to perform the task effectively, the sensing glove 100 can give feedback to alert the user to decrease an amount of force or pressure before damaging the object or increase an amount of force or pressure to perform the task more efficiently. Also, if a user moves too slowly to perform the task efficiently, or moves too quickly, the sensing glove 100 can give feedback to alert the user to increase or decrease an amount of motion or speed of the glove, respectively. The sensing glove 100 can give feedback in this way with respect to a plurality of sensed modalities, including trajectory, position, orientation, velocity, acceleration, temperature, images, etc.

For example, in some cases, a task may involve an application of forces to an object or motions with the object that may be difficult to train by demonstration, such as deburring edges. In such cases, the forces and motions of the user, measured by the sensing glove 100, may be compared against the forces and motions of a primary user or expert, measured by another sensing glove 100 serving as a primary sensing glove. The user can then receive feedback through sensing glove 100, based on their relative performance.

In some cases, the sensing glove 100 can be used to track user fatigue or degradation of applied forces or motions during tasks. For example, applied force or pressure distributions may be measured at time intervals corresponding to time stamps. The user can then be alerted to take a break to maintain appropriate levels of force or motion output, and/or the task may be adjusted to reduce user fatigue.

In some cases, the sensing glove 100 can be used for data collection in which the user executes a multitude of tasks in conjunction with other sensing modalities in the environment, such as scene cameras and/or microphones. The time-stamped measurements can further be used to generate a machine learning model that incorporates human-like tactile sensing.

In some cases, the sensing glove 100 can be used for athletic training, such as grip optimization for golf, baseball, or tennis. For example, in each of these sports, the system can collect force or pressure data and motion data from the sensing glove 100 during use, such as when hitting a baseball or tennis ball in the presence of the expert (e.g., an instructor or coach in this case). The expert can then analyze the data streamed from the sensing glove 100 to a host computer (e.g., the control system 402), and provide feedback to the user with regard to adjusting the gripping or holding applied to optimize the user's performance.

Figure 11:
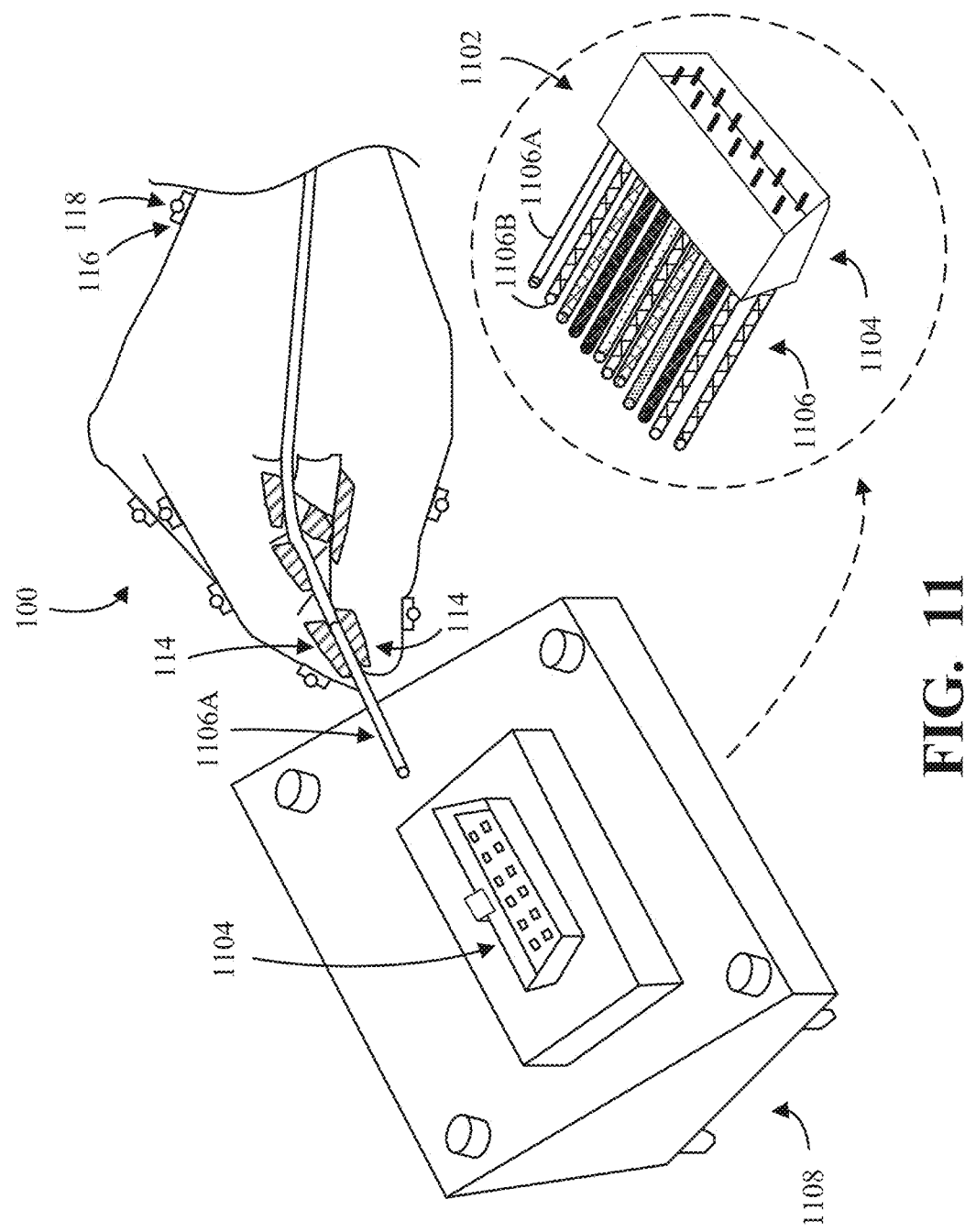
FIG. 11 is an example of a sensing glove utilized to perform a task.

FIG. 11 is an example of a sensing glove 100 utilized to perform a task. For example, the task may be an assembly task for producing a connector assembly 1102, such as wiring for automotive or computer applications. The connector assembly 1102 may comprise a connector housing 1104 and a plurality of wires 1106. The connector assembly 1102 may have a predefined wiring layout or arrangement for the plurality of wires, corresponding to an orientation or direction of the connector housing 1104. For example, the connector housing 1104 may have a trapezoidal shape that defines the orientation, so that the connector assembly 1102 is keyed. During the assembly task, the connector housing 1104 may be temporarily affixed to a connector base 1108. The plurality of wires may include one or more of power, ground, control, and/or data wires. Each wire may be identified based on color and/or other markings on an insulation portion. Each wire of the plurality of wires 1106 may be individually assembled and tested with the connector housing 1104 to produce the connector assembly 1102 in performance of the assembly task. A user or a robotic device may wear the sensing glove 100 to perform the task to generate measurements as described herein. Further, an expert or robotic device may wear the sensing glove 100 to perform the task to generate primary measurements as described herein.

Figure 12:
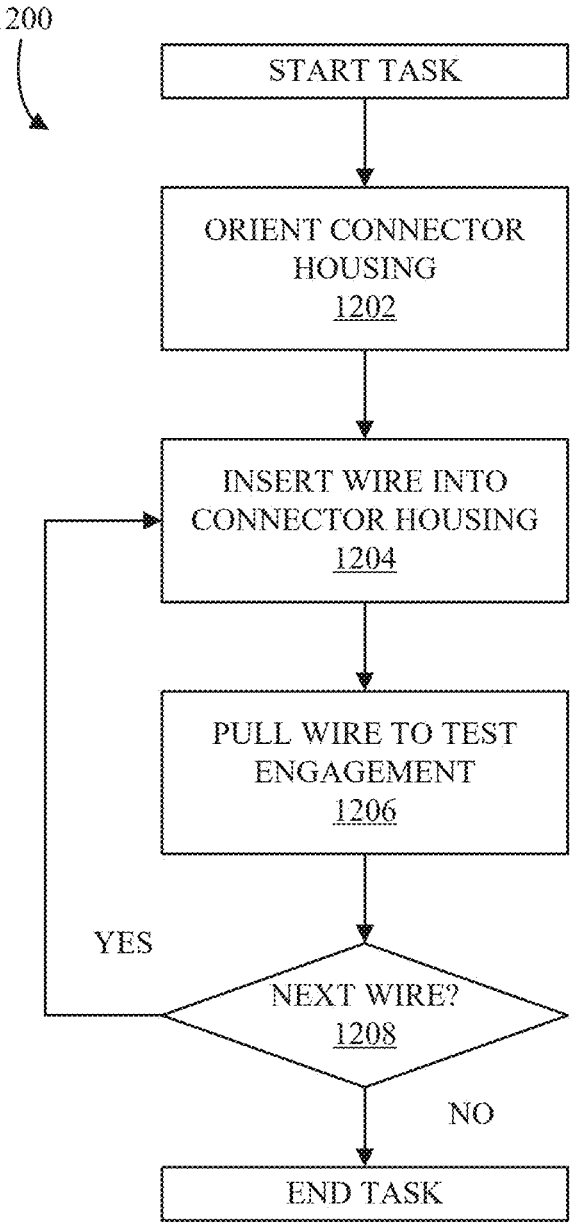
FIG. 12 is an example of a process for a task utilizing a sensing glove.

For example, with additional reference to FIG. 12, an example of a process 1200 for a task, e.g., an assembly task utilizing a sensing glove 100 is provided. At operation 1202, the sensing glove 100 may be utilized to orient the connector housing 1104. Orienting the connector housing 1104 may involve positioning the connector housing 1104 so that the orientation is correct for receiving the wire (e.g., the trapezoidal shape in the right direction) resulting in a force measurement and/or a motion measurement. The force measurement and/or motion measurement may be compared with those of a primary measurement. In some cases, one sensing glove may be utilized to perform this step, such as to hold the wire 1106A relative to the connector housing 1104. In some cases, two sensing gloves may be utilized to perform this step, such as a first sensing glove to hold the wire 1106A and a second sensing glove to hold the connector housing 1104. In some cases, a robotic device can perform this step by utilizing computer vision (e.g., the scene camera 406). In some cases, a robotic device can perform this step based on force sensing and motion sensing alone and without utilizing computer vision or a camera (e.g., based on feel associated with the force sensing).

At operation 1204, the sensing glove 100 may be utilized to insert the wire 1106A into the connector housing 1104. Inserting the wire 1106A into the connector housing 1104 may involve pushing an exposed end (e.g., copper) of the wire (with terminal or other wire termination) 1106A into a particular slot of the connector housing 1104 according to the orientation and the predefined wiring layout resulting in a force measurement. The force measurement may be compared with those of a primary measurement. Pushing the wire 1106A into the slot may cause a retention clip of the connector housing 1104 to capture the wire 1106A in place (e.g., via an actuating, barbed retention mechanism). In some cases, one sensing glove may be utilized to perform this step, such as to insert the wire 1106A relative to the connector housing 1104 affixed to the connector base 1108. In some cases, two sensing gloves may be utilized to perform this step, such as a first sensing glove to hold the wire 1106A and a second sensing glove to hold the connector housing 1104 and merge the two. In some cases, a robotic device can perform this step by utilizing computer vision (e.g., the scene camera 406). In some cases, a robotic device can perform this step based on force sensing and motion sensing alone and without utilizing computer vision or a camera.

At operation 1206, the sensing glove 100 may be utilized to pull the wire 1106A to test engagement with the connector housing 1104. Pulling the wire 1106A to test engagement with the connector housing 1104 may involve pulling the wire away from the connector housing 1104 resulting in a force measurement. The force measurement may be compared with a primary measurement, which may be in a range between a minimum amount of force to test the capture of the wire 1106A (e.g., via the actuating, barbed retention mechanism), but less than a maximum amount of force that might damage the wire 1106A and/or compromise the connection. In some cases, one sensing glove may be utilized to perform this step, such as pull insert the wire 1106A relative to the connector housing 1104 affixed to the connector base 1108. In some cases, two sensing gloves may be utilized to perform this step, such as a first sensing glove to pull the wire 1106A and a second sensing glove to pull the connector housing 1104 away from one another. In some cases, a robotic device can perform this step by utilizing computer vision (e.g., the scene camera 406). In some cases, a robotic device can perform this step based on force sensing and motion sensing alone and without utilizing computer vision or a camera.

At operation 1208, if a next wire (e.g., a wire 1106B) is to be assembled with the connector housing 1104 to produce the connector assembly 1102 ("Yes"), the process may return to operation 1204 to insert the next wire (having already oriented the connector housing 1104). However, if a next wire is not to be assembled with the connector housing 1104 ("No"), and production of the connector assembly 1102 is complete, the assembly task may be completed and the process may end.

As used herein, the term "circuitry" refers to an arrangement of electronic components (e.g., transistors, resistors, capacitors, and/or inductors) that is structured to implement one or more functions. For example, a circuit may include one or more transistors interconnected to form logic gates that collectively implement a logical function.

In utilizing the various aspects of the embodiments, it would become apparent to one skilled in the art that combinations or variations of the above embodiments are possible for utilizing sensing gloves to perform tasks. Although the embodiments have been described in language specific to structural features and/or methodological acts, it is to be understood that the appended claims are not necessarily limited to the specific features or acts described. The specific features and acts disclosed are instead to be understood as embodiments of the claims useful for illustration.

What is claimed is:

1. A sensing glove for performing a task, comprising:
    a glove to be worn by a user, the glove including fingers having fingertips;
    a force sensor array coupled with a fingertip of a finger, the force sensor array including a plurality of force sensors, each force sensor individually providing a digital output indicating force data from the fingertip;
    a motion sensor coupled with the finger;
    digital readout circuitry to receive digital outputs from the force sensor array and the motion sensor; and
    a processor executing instructions stored in memory to:
        generate a measurement corresponding to the user performing a task with an object, wherein the measurement is based on the digital outputs from the force sensor array at the fingertip and the motion sensor at the finger; and
        generate feedback based on a comparison between the measurement and a primary measurement from a primary sensing glove utilized to perform the task with the object, the primary measurement based on digital outputs of a force sensor array at a fingertip and a motion sensor at a finger of the primary sensing glove.

2. The sensing glove of claim 1, wherein the force sensor array is coupled with a flexible circuit arranged on a palmar side of the fingertip, and wherein the motion sensor is coupled with another flexible circuit arranged on a dorsal side of the fingertip.

3. The sensing glove of claim 1, wherein the glove comprises a textile, and wherein the force sensor array is one of a plurality of force sensor arrays coupled with finger sections of the glove via the textile.

4. The sensing glove of claim 1, wherein the measurement includes a) a pressure distribution from the force sensor array, and b) an orientation of the finger relative to a wrist portion of the glove.

5. The sensing glove of claim 1, wherein the feedback includes illumination of a light emitting diode (LED) coupled with the glove.

6. The sensing glove of claim 1, further comprising:
    a haptic actuator coupled with the glove, wherein the feedback includes haptic feedback applied via the haptic actuator.

7. The sensing glove of claim 1, wherein the force sensor array is coupled with a flexible circuit having a strain relief that enables bending of the finger.

8. The sensing glove of claim 1, further comprising:

a microphone coupled with the glove to receive an audible cue associated with the task.

9. The sensing glove of claim 1, further comprising:

a second force sensor array coupled with a thumb tip of a thumb of the glove, the second force sensor array including a plurality of force sensors, each force sensor individually providing a digital output indicating force data from the thumb tip.

10. The sensing glove of claim 9, further comprising:

a third force sensor array coupled with a finger section between joints of the finger, the third force sensor array including a plurality of force sensors, each force sensor individually providing a digital output indicating force data from the finger section.

11. The sensing glove of claim 1, further comprising:

a second force sensor array coupled with the glove, the second force sensor array having a lower or higher density of force sensors per unit area than the force sensor array coupled with the fingertip.

12. The sensing glove of claim 11, wherein the second force sensor array is coupled with a palm of the glove.

13. The sensing glove of claim 1, further comprising:

a plurality of optical markers coupled with the glove, including an optical marker coupled with the finger.

14. The sensing glove of claim 1, wherein the feedback is based on a time stamped measurement from the sensing glove compared to a time stamped measurement from the primary sensing glove, the time stamped measurement from the sensing glove including the force data and motion data from the motion sensor at a time stamp.

15. A method for performing a task, comprising:

receiving a measurement from a sensing glove utilized to perform a task with an object, the measurement based on digital outputs of force sensor arrays and digital outputs of motion sensors received by digital readout circuitry of the sensing glove, including a force sensor array including a plurality of force sensors coupled with a fingertip of a finger of the sensing glove and a motion sensor coupled with the finger, the force sensor array including a plurality of force sensors, each force sensor individually providing a digital output indicating force data from the fingertip; and generating feedback based on a comparison between the measurement and a primary measurement from a primary sensing glove utilized to perform the task with the object, the primary measurement based on digital outputs of force sensor arrays and digital outputs of motion sensors of the primary sensing glove that correspond to digital outputs of the sensing glove, including digital outputs of a force sensor array at a fingertip and a motion sensor at a finger of the primary sensing glove.

16. The method of claim 15, further comprising:

aggregating the measurement with a plurality of measurements from a plurality of sensing gloves to determine a performance metric corresponding to the task.

17. The method of claim 15, wherein the task comprises a) orienting a connector housing, b) inserting a wire into the connector housing, and c) pulling the wire to test engagement with the connector housing.

18. The method of claim 15, further comprising:

controlling a robotic device to perform the task based on the primary measurement.

19. The method of claim 15, wherein the measurement includes temperature data from digital outputs of temperature sensors mounted on a palmar side of the sensing glove.

20. The method of claim 15, wherein the measurement includes proximity data from digital outputs of proximity sensors mounted on a palmar side of the sensing glove.

21. The method of claim 15, wherein the feedback indicates to increase or decrease an amount of force or motion with the object.

22. The method of claim 15, wherein the feedback indicates an adjustment for gripping or holding the object.

23. The method of claim 15, further comprising:

receiving via a microphone an audible cue associated with the task.

24. A system using a sensing glove to perform a task, comprising:

a sensing glove to be worn by a user, the sensing glove including:

fingers having fingertips;

a force sensor array coupled with a fingertip of a finger, the force sensor array including a plurality of force sensors, each force sensor individually providing a digital output indicating force data from the fingertip;

a motion sensor coupled with the finger; and digital readout circuitry to receive digital outputs from the force sensor array and the motion sensor; and one or more processors configured to:

generate a measurement corresponding to the user performing a task with an object, wherein the measurement is based on the digital outputs from the force sensor array at the fingertip and the motion sensor at the finger; and generate feedback based on a comparison between the measurement and a standard established by a primary measurement from a primary sensing glove utilized to perform the task with the object, the primary measurement based on digital outputs of a force sensor array at a fingertip and a motion sensor at a finger of the primary sensing glove.

* * * * *